(12) United States Patent
Koch

(10) Patent No.: US 7,147,231 B2
(45) Date of Patent: Dec. 12, 2006

(54) SEAL FEATURE TO PREVENT BENDING

(75) Inventor: Steve George Koch, Gregory, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/790,916

(22) Filed: Mar. 2, 2004

(65) Prior Publication Data

US 2004/0173974 A1    Sep. 9, 2004

Related U.S. Application Data

(60) Provisional application No. 60/452,013, filed on Mar. 5, 2003.

(51) Int. Cl.
F16J 15/06 (2006.01)
F16J 15/10 (2006.01)

(52) U.S. Cl. .................................. 277/592; 277/596

(58) Field of Classification Search ......... 277/592–598
See application file for complete search history.

(56) References Cited

U.S. PATENT DOCUMENTS

| | | | | |
|---|---|---|---|---|
| 3,794,333 A | * | 2/1974 | Czernik et al. | 277/593 |
| 4,088,347 A | * | 5/1978 | Bruggemann et al. | 285/24 |
| 4,181,313 A | * | 1/1980 | Hillier et al. | 277/638 |
| 4,625,979 A | * | 12/1986 | Inciong | 277/596 |
| 4,635,949 A | * | 1/1987 | Lucas et al. | 277/595 |
| 4,778,189 A | * | 10/1988 | Udagawa | 277/648 |
| 5,427,389 A | * | 6/1995 | Ishikawa et al. | 277/595 |
| 5,700,017 A | * | 12/1997 | Tensor | 277/596 |
| 5,938,208 A | * | 8/1999 | Yoshida et al. | 277/592 |
| 5,951,024 A | * | 9/1999 | Montjoy et al. | 279/43 |

* cited by examiner

*Primary Examiner*—Vishal Patel
(74) *Attorney, Agent, or Firm*—Ronald W. Wangerow; Harness, Dickey & Pierce, P.L.C.

(57) ABSTRACT

A gasket for statically sealing between two members is disclosed. The gasket includes a first generally planar portion having an inner perimeter and an exterior perimeter, and having a first surface and a second surface on an opposite side from the first surface. A seal bead rises from the first surface a first predetermined height and extends about the inner perimeter. A fastener hole extends through the first portion and is located between the seal bead and the exterior perimeter. The gasket also includes a protruding feature located between the fastener hole and the exterior perimeter that rises from the first surface a second predetermined height that is about equal to or greater than the first predetermined height.

10 Claims, 4 Drawing Sheets

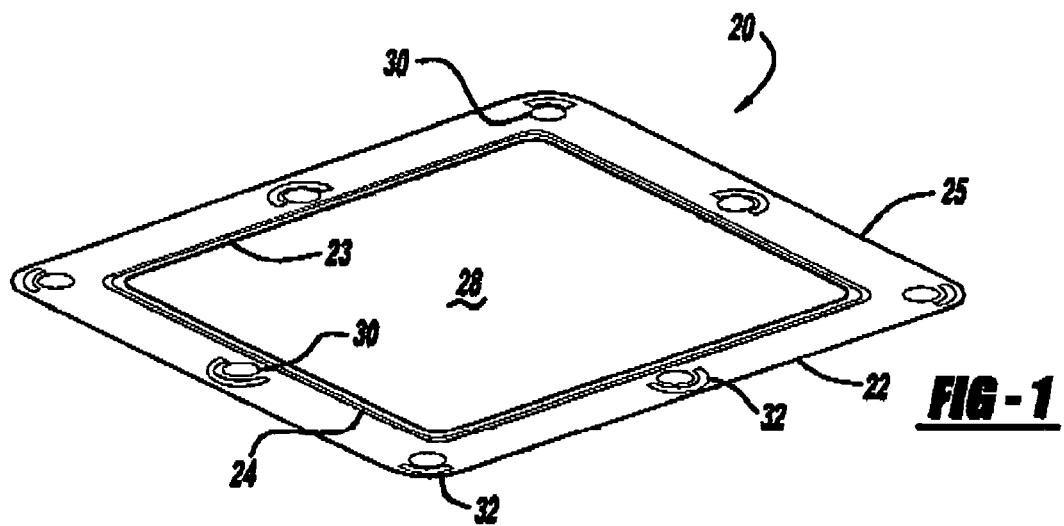
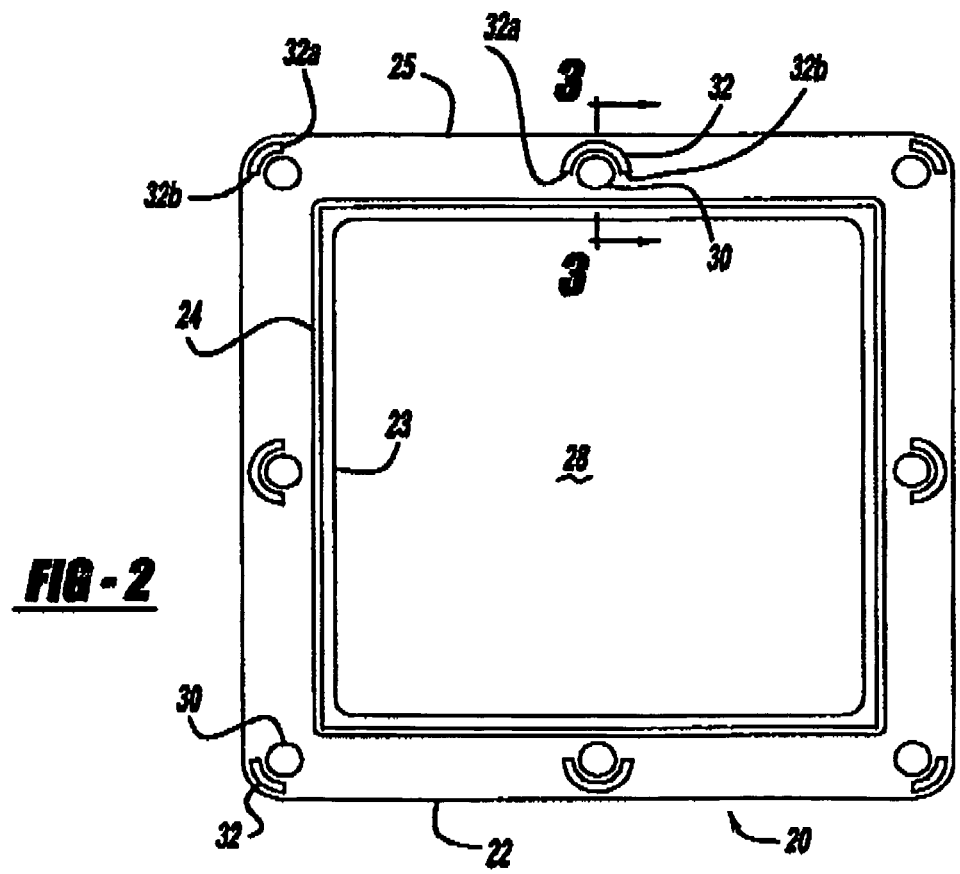

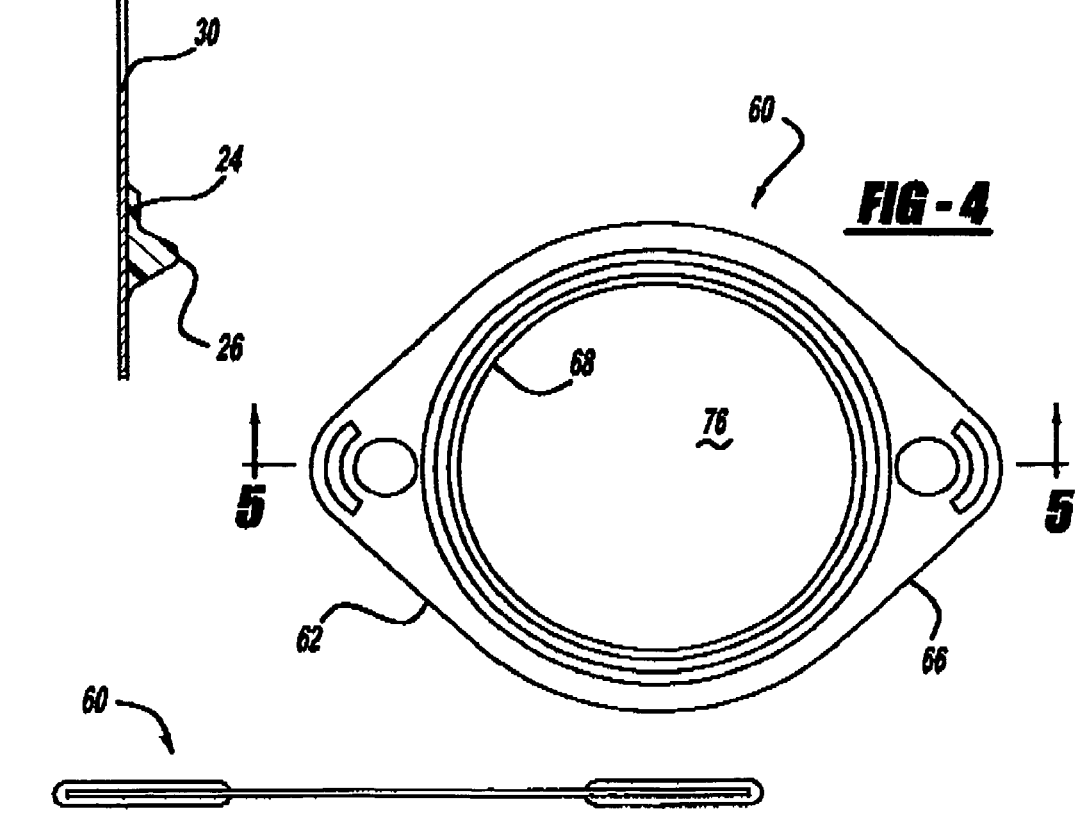

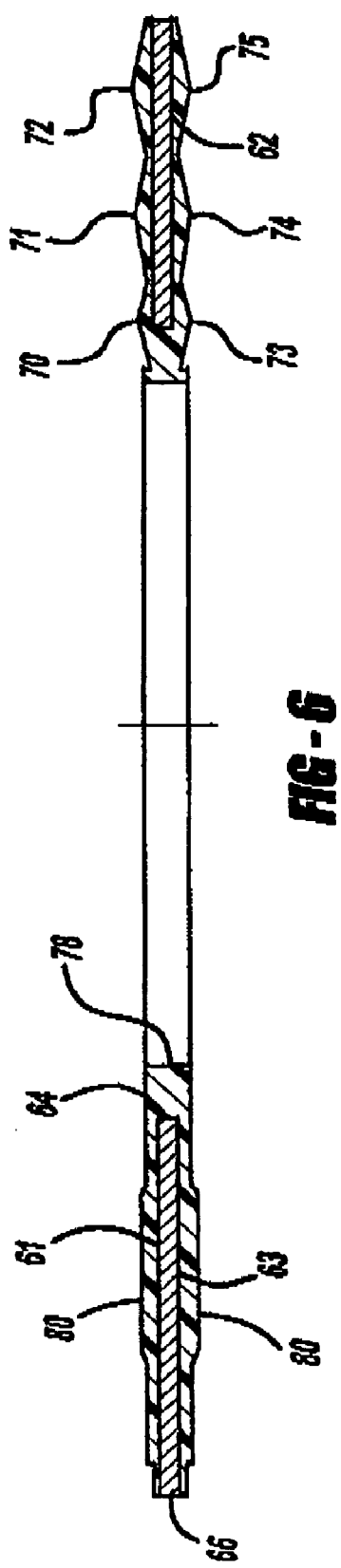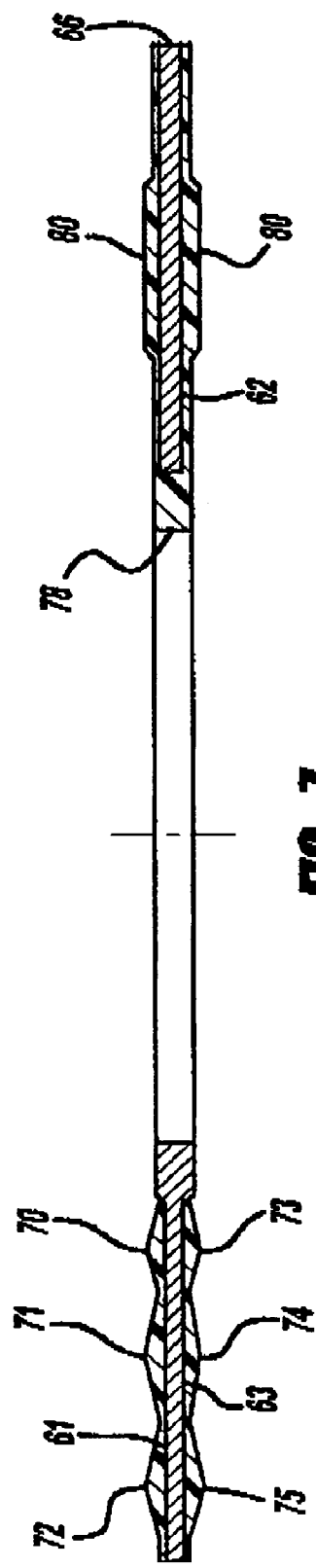

SEAL FEATURE TO PREVENT BENDING

PRIORITY CLAIM

This application claims priority from U.S. Provisional Application No. 60/452,013, filed Mar. 5, 2003.

BACKGROUND OF INVENTION

This invention relates in general to static seals, and more particularly to static seals with sealing beads and fastener holes therethrough.

Static seals, also called gaskets, are often employed to seal around a perimeter of an opening, through hole, etc. Often times fastener holes are employed to hold a member against the seal or some other member on the opposite side of the seal. Also, it is common to have sealing beads extending from the surface to be sealed. The sealing beads create a localized area of high sealing force along the peaks of the beads.

A concern arises, however, when fastener holes are required to be located in close proximity to a bead—particularly when the fastener extends through a flange area that is outside of the area to be sealed. The torque on the fasteners, which may be needed to create the sealing force or for other reasons, may cause the member against which the seal is mating to bend about the sealing beads. This is particularly true for gaskets that are sealed with a relatively high clamping load relative to the thickness of one or both flanges to be sealed.

An example of such a prior art arrangement is illustrated in FIG. 9. A gasket 10 is employed to mount and seal against a member 12, with fasteners 14 securing the two together and creating the sealing force against seal bead 16. The seal bead 16 extends around the perimeter of an area 18 to be sealed. However, with the fasteners 14 through the flanges outside of the sealing bead 16, the member 12 has a tendency to bend. This bending may, in fact, create a leak path, thus making the gasket 10 ineffective. In an attempt to avoid this concern, some have tried adding grommets about each fastener, but this increases the number of parts in the assembly and adds to the complexity of assembling the gasket to the member.

Thus, it is desirable to provide a static seal that will allow for fasteners being located near sealing beads, while preventing flange bending that may lead to an ineffective seal between the seal and the member against which it is sealing.

SUMMARY OF INVENTION

In its embodiments, the present invention contemplates a gasket that includes a first generally planar portion having an inner perimeter and an exterior perimeter, and having a first surface and a second surface on an opposite side from the first surface. The gasket also includes a seal bead rising from the first surface a first predetermined height, and being adjacent to and extending about the inner perimeter, and a fastener hole extending through the first portion from the first surface to the second surface and located between the seal bead and the exterior perimeter. The gasket of the present invention also includes a protruding feature located between the fastener hole and the exterior perimeter, and rising from the first surface a second predetermined height that is about equal to or greater than the first predetermined height.

An advantage of the present invention is that a flange sealing against a sealing bead via torque from a bolt does not bend in such a way as to weaken the seal due to flange bending.

Another advantage of the present invention is that the reduced bending in a flange will reduce the chances for generating a crack in the flange due to the bolt torque.

A further advantage of the present invention is that the desired amount of sealing force on the seal bead is maintained after assembly of a gasket to a flange.

BRIEF DESCRIPTION OF DRAWINGS

FIG. 1 is a perspective view of a gasket particularly suited for use sealing around the perimeter of an individual cell in a fuel cell assembly;

FIG. 2 is a plan view of the gasket of FIG. 1, on an enlarged scale;

FIG. 3 is a section cut, on an enlarged scale, taken along line A—A in FIG. 2;

FIG. 4 is a plan view of a gasket for sealing to a perimeter of an opening in a vehicle thermostat;

FIG. 5 is a section cut of a gasket taken along line A—A in FIG. 4;

FIG. 6 is an enlarged portion of the gasket of FIG. 5, taken from encircled area B in FIG. 5;

FIG. 7 is an enlarged portion of the gasket of FIG. 5, taken from encircled area C in FIG. 5;

DETAILED DESCRIPTION

Figure 8:
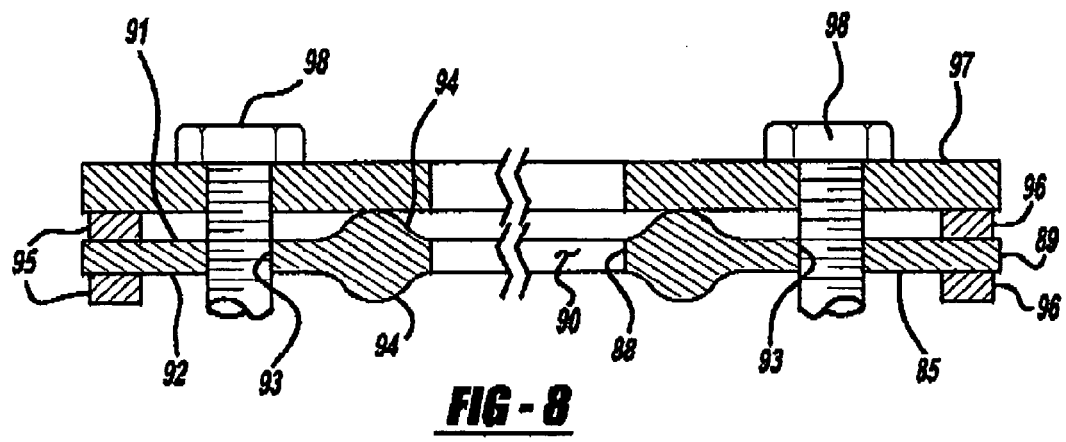
FIG. 8 is a section cut through another gasket and flange assembly, in accordance with an embodiment of the present invention.
Figure 9:
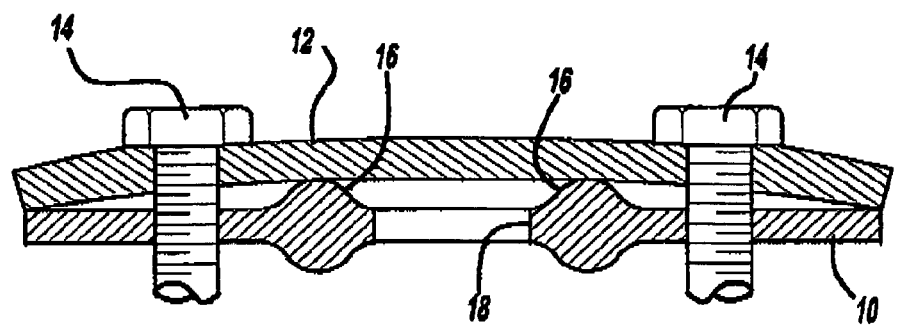
FIG. 9 is a section cut through a prior art gasket and flange assembly.

FIGS. 1–3 illustrate a gasket 20 that is most advantageously employed as a gasket for sealing in an individual cell of a fuel cell assembly. In a fuel cell assembly, the member (not shown) to which the gasket seals may be very thin, making it particularly susceptible to damage during assembly. The gasket 20 includes a carrier member 22 that includes an interior perimeter 23, which defines a cutout area 28, and an exterior perimeter 25. The carrier 22 is preferably a thin, somewhat flexible member that is preferably made of a polymeric material. The carrier member 22 has an elastomeric seal member 24 mounted (or molded) thereon. The elastomeric seal member 24 includes a seal bead portion 26 that extends about the interior perimeter 23, in order to seal around the area 28. While the elastomeric seal member 24 provides the sealing against a member to be sealed (not shown in FIGS. 1–3), the carrier 22, even though thin and flexible, aids in handling the gasket 20 during assembly to other components since it improves the retention of two dimensions of the gasket 20.

The carrier 22 also includes eight fastener holes 30 extending therethrough, spaced between the seal bead 26 and the exterior perimeter 25. Adjacent each fastener hole 30, between the hole 30 and the exterior perimeter 25, is a protruding feature 32 spaced form the bead. Each protruding feature 32 preferably rises above the surface of the carrier 22 a height that is about equal to or greater than the height of the seal bead 26. As shown in FIG. 2, each protruding feature 32 has two terminating end portions 32a, 32b such that the protruding feature only partially circumscribes the hole 30 so that the protruding feature does not completely surround or circumscribe the hole 30. As an alternative, if so desired, the protruding member 24 and/or the seal features 32 can be formed integral with the carrier 22, such as with a molding operation. And, of course, a second set of protruding features and a seal bead can extend from the opposite surface of the gasket 20 in order to seal to a second member that mounts on the opposite side of the gasket, if so desired.

During the assembly process, the compressive force applied to the gasket 20, due to the torque applied by fasteners, will be counteracted by both the sealing bead 26 and the protruding features 32. Thus, if the height of the protruding features 32 are about the same as the height of the seal bead 26, they will essentially eliminate flange bending. This assures that the desired sealing force is applied to the seal bead 26, while significantly reducing any chances of flange cracking during the assembly process. If the height of the protruding features 32 are greater than the height of the seal bead 26, they will cause a slight inward bending of the flange, thus increasing the sealing force on the sealing bead 26. It is preferable that the height difference is small, however, in order to avoid concerns with flange cracking during assembly.

FIGS. 4–7 illustrate another embodiment of the gasket 60 of the present invention that is most advantageously employed as a gasket for sealing between a thermostat (not shown) and a mating component (not shown) in a vehicle engine cooling system (not shown). The gasket includes a carrier member 62 that is preferably formed of a metal or plastic material, and includes a first side 61 and an opposite, second side 63. Molded over the carrier member 62 is a elastomeric seal member 64, which is preferably made of a material with good sealing properties, such as rubber.

The gasket 60 includes an exterior perimeter 66 and an interior perimeter 68. Rising from the first side 61 between the exterior perimeter 66 and the interior perimeter 68 are three seal beads 70, 71, 72. Rising from the second side 63 between the exterior perimeter 66 and the interior perimeter 68 are three more seal beads 73, 74, 75. The six seal beads 70–75 extend around the circumference of the interior perimeter 68 in order to seal about a cutout area 76.

The gasket 60 also includes two fastener holes 78 therethrough that are located between the seal beads 70–75 and the exterior perimeter 66. Adjacent each fastener hole 78, between the hole 78 and the exterior perimeter 66, is a pair of protruding features 80 which are configured generally the same as protruding features 32. The protruding feature 80 for each fastener hole 78 rise from opposite sides of the carrier 62. Again, as with the first embodiment, each protruding feature 80 preferably rises a height above the surface of the carrier 62 that is about equal to or greater than the height of the corresponding seal beads 70–75. The protruding features 80 will minimize flange bending and assure the appropriate sealing force on the seal beads 70–75, the same as described above relative to the first embodiment.

FIG. 8 illustrates another embodiment of the present invention. A gasket 85 has an inner perimeter 88, which defines a cutout area 90, and an exterior perimeter 89, as well as a first surface 91 and a second, opposite surface 92. The gasket 85 includes a pair of seal beads 93, 94 extending about the inner perimeter 88, with one rising above the first surface 91 and the other rising from the second surface 92. A pair of fastener holes 93 through the gasket 85 are located between the seal beads 94 and the exterior perimeter 89. Adjacent each fastener hole 93, between the respective fastener hole 93 and the exterior perimeter 89, is a pair of protruding features 95, 96 which are configured generally the same as protruding features 32. Each protruding features 95, 96 in a pair extends from the opposite surface of the gasket 85 from the other, and rises a height above the corresponding surface of the gasket that is about equal to or greater than the height of the corresponding sealing bead. Then, when a member 97 to be sealed is compressed against the gasket 85 by fasteners 98, the protruding features 95, 96 will cooperate with the seal bead 94 to minimize flange bending and assure the appropriate amount of sealing force on the seal bead 94.

While certain embodiments of the present invention have been described in detail, those familiar with the art to which this invention relates will recognize various alternative designs and embodiments for practicing the invention as defined by the following claims.

What is claimed is:

1. A gasket comprising:
   a first generally planar portion having an inner perimeter and an exterior perimeter, and having a first surface and a second surface on an opposite side from the first surface;
   a seal bead rising from the first surface a first predetermined height, and being generally adjacent to and extending about the inner perimeter, said seal bead being made from a first material;
   a fastener hole extending through the first portion from the first surface to the second surface and located between the seal bead and the exterior perimeter; and
   a protruding feature made from said first material and located between the fastener hole and the exterior perimeter and spaced from said seal bead, and rising from the first surface a second predetermined height that is about equal to or greater than the first predetermined height, said protruding feature having first and second terminating end portion so as not to circumscribe said fastener hole.

2. The gasket of claim 1 further including a second seal bead rising from the second surface a third predetermined height, and being adjacent to and extending about the inner perimeter; and a second protruding feature located between the fastener hole and the exterior perimeter, and rising from the second surface a fourth predetermined height that is about equal to or greater than the third predetermined height.

3. The gasket of claim 2 wherein the gasket is adapted to seal between separator plates in an individual cell of a fuel cell assembly.

4. The gasket of claim 2 wherein the gasket is adapted to seal between a thermostat and a mating member in a cooling system of an engine.

5. The gasket of claim 1 wherein the first generally planar portion is a carrier made of a polymeric material and the seal bead is made of an elastomeric material.

6. The gasket of claim 5 wherein the seal bead is molded to the carrier after the carrier is formed.

7. The gasket of claim 1 wherein the first generally planar portion and the seal bead are molded integrally from an elastomeric material.

8. The gasket of claim 1 further including a second seal bead rising from the first surface the first predetermined height, and being adjacent to and extending about the seal bead.

9. The gasket of claim 1 further including a second fastener hole extending through the first portion from the first surface to the second surface, spaced from the fastener hole, and located between the seal bead and the exterior perimeter; and
   a second protruding feature located between the second fastener hole and the exterior perimeter, and rising from the first surface the second predetermined height.

10. A method of making a gasket comprising the steps of:
forming a first generally planar portion having an inner perimeter and an exterior perimeter, and having a first surface and a second surface on an opposite side from the first surface;
forming a seal bead so that the seal bead rises from the first surface a first predetermined height, and is generally adjacent to and extending about the inner perimeter, said seal bead being made from a first material;
creating a fastener hole extending through the first portion from the first surface to the second surface and located between the seal bead and the exterior perimeter; and
forming a protruding feature made from said first material between the fastener hole and the exterior perimeter and spaced from said seal bead, and rising from the first surface a second predetermined height that is about equal to or greater than the first predetermined height said protruding feature having first and second terminating end portions so as not to circumscribe said fastener hole.

* * * * *